United States Patent
Pepin et al.

(10) Patent No.: US 9,885,431 B2
(45) Date of Patent: Feb. 6, 2018

(54) MECHANICALLY LINED PIPE

(71) Applicant: TECHNIP FRANCE, Courbevoie (FR)

(72) Inventors: Aurélien Pepin, Aberdeen (GB); Tomasz Tkaczyk, Westhill (GB)

(73) Assignee: TECHNIP FRANCE (FR)

( * ) Notice: Subject to any disclaimer, the term of this patent is extended or adjusted under 35 U.S.C. 154(b) by 219 days.

(21) Appl. No.: 14/646,283

(22) PCT Filed: Nov. 13, 2013

(86) PCT No.: PCT/IB2013/002894
§ 371 (c)(1),
(2) Date: May 20, 2015

(87) PCT Pub. No.: WO2014/080281
PCT Pub. Date: May 30, 2014

(65) Prior Publication Data
US 2015/0337995 A1    Nov. 26, 2015

(30) Foreign Application Priority Data

Nov. 22, 2012  (GB) .................................. 1221008.4

(51) Int. Cl.
*F16L 9/22*    (2006.01)
*B23K 31/02*   (2006.01)
(Continued)

(52) U.S. Cl.
CPC ................ *F16L 9/22* (2013.01); *B23K 31/02* (2013.01); *F16L 1/203* (2013.01); *F16L 9/147* (2013.01); *F16L 13/0263* (2013.01)

(58) Field of Classification Search
CPC .......... B23K 9/18; B23K 9/182; B23K 9/184; B23K 9/186; B23K 9/188; B23K 2201/04;
(Continued)

(56) References Cited

U.S. PATENT DOCUMENTS 2,736,090 A * 2/1956 Sowter et al. ......... B23K 20/02
                                                228/115
3,068,562 A * 12/1962 Long ...................... B21D 51/24
                                                220/586

(Continued)

FOREIGN PATENT DOCUMENTS

GB    2 474 736    4/2011
GB    2476457      6/2011
(Continued)

OTHER PUBLICATIONS

Search Report dated Mar. 19, 2013 issued in corresponding United Kingdom Application No. GB1221008.4.
(Continued)

*Primary Examiner* — Craig Schneider
*Assistant Examiner* — David Deal
(74) *Attorney, Agent, or Firm* — Ostrolenk Faber LLP

(57) ABSTRACT

A reelable mechanically lined pipe (MLP) (30) having at least a liner (32) and an outer pipe (34), the outer pipe having an outer diameter, DH, with the MLP formed from a plurality of pipe joints having conjoining girth welds (36), wherein the ends of each pipe joint terminate with clad overlay welds (40) having a length in the range $L_{min}=100$ mm and $L_{max}=4D_H$, and wherein the liner thickness, t, is equal to or less than a value calculated by formula I as defined.

8 Claims, 2 Drawing Sheets

(51) Int. Cl.
*F16L 1/20* (2006.01)
*F16L 9/147* (2006.01)
*F16L 13/02* (2006.01)

(58) Field of Classification Search
CPC .......... B23K 2201/045; B23K 2201/06; B23K 2201/08; B23K 2201/10; B23K 2201/12; B23K 2201/125
USPC .................. 219/73; 138/155, 140–143, 177
See application file for complete search history.

(56) References Cited

U.S. PATENT DOCUMENTS

| | | | |
|---|---|---|---|
| 2010/0034590 A1 | 2/2010 | Endal et al. ................. | 405/166 |
| 2011/0296923 A1* | 12/2011 | Cataldo ............... | G01N 29/043 73/632 |
| 2012/0257931 A1 | 10/2012 | Tkaczyk et al. ........... | 405/168.3 |
| 2012/0285576 A1* | 11/2012 | Nishimura ........... | B23K 9/0282 138/177 |
| 2012/0325362 A1* | 12/2012 | Ishigami .............. | B23K 9/0253 138/155 |

FOREIGN PATENT DOCUMENTS

| | | | | |
|---|---|---|---|---|
| GB | 2479379 | 10/2011 | | |
| WO | WO 2007121216 A2 * | 10/2007 | ............ | B23K 31/12 |
| WO | WO 2008/072970 A1 | 6/2008 | | |
| WO | WO 2011/048430 A1 | 4/2011 | | |

OTHER PUBLICATIONS

Smith et al., "Reliability Based Assessment of Minimum Wall Thickness for Reeling—A Focus on Cold Worked Pipe", Proceedings of the ASME 2011 30$^{th}$ International Conference on Ocean, Offshore and Arctic Engineering (2011) pp. 1-9.

Tkaczyk et al.,"Fatigue and Fracture Performance of Reeled Mechanically Lined Pipes", Proceedings of the Twenty-second (2012) International Offshore and Polar Engineering Conference (2012) pp. 603-612.

Wilmot et al., "The Suitability of CRA Lined Pipes for Flowlines Susceptible to Lateral Buckling", SUT Global Pipeline Buckling Symposium (2011) pp. 1-13.

International Search Report dated May 26, 2014 issued in corresponding International patent application No. PCT/IB2013/002894.

International Preliminary Report on Patentability and Written Opinion dated May 26, 2015 issued in corresponding International Patent Application No. PCT/IB2013/002894.

* cited by examiner

MECHANICALLY LINED PIPE

CROSS REFERENCE TO RELATED APPLICATIONS

The present application is a 35 U.S.C. §371 National Phase conversion of PCT/IB2013/002894, filed Nov. 13, 2013, claiming the benefit of United Kingdom Application no. 1221008.4, filed Nov. 22, 2012, the disclosure of which is incorporated herein by reference. The PCT International Application was published in the English language.

TECHNICAL FIELD OF THE INVENTION

The present invention relates to a mechanically lined pipe (MLP), particularly but not exclusively to provide a submarine pipeline, which can be reeled at atmospheric pressure without a risk of buckling/wrinkling even in the case of a significant plastic moment mismatch between consecutive pipe joints; and to a method of manufacture of such an MLP. It relates to MLPs which are specifically designed to be used in reeled laying methods, including those described in Standard API 5L/ISO 3183:2007 for welded steel pipes.

BACKGROUND OF THE INVENTION

Corrosion resistant pipelines for the submarine or otherwise underwater transportation or conveying of corrosive fluids such as gas or crude oil can be provided by pipes having an internal metallic liner. A double-walled or bi-metallic pipe is generally composed of two metallic layers. The outer layer is to provide resistance against buckling on the reel or sea bottom and provides general strength to the pipe so as to resist to hydrostatic and internal pressure, whilst the internal layer protects the outer layer from damage (corrosion) due to the chemical composition of the fluid being conveyed, and may also provide strength (e.g. for pressure containment). The inner layer is sometimes also termed a "liner". As the main purpose is to protect the outer layer from corrosion, a corrosion resistant alloy (CRA) is commonly chosen as the liner.

One form of bi-metallic pipe can be termed a mechanically lined pipe (MLP), where a liner is fixed to the outer layer (such as carbon steel) without metallurgical bonding. An economical method of forming a lined pipe uses hydraulic and/or mechanical expansion, where the liner is inserted into the outer layer, and then both parts are expanded. During the expansion, the inner pipe undergoes a plastic deformation while the outer layer undergoes either elastic or plastic deformation, depending on the manufacturing process.

One example of this comprises inserting an alloy 316L liner inside a carbon steel host pipe, and expanding the liner radially so that it comes into contact with the host pipe. Then the host pipe outer diameter will also expand together with the liner to a pre-determined strain level such that, following relaxation of the internal pressure, an interference contact stress between the liner and the host pipe remains.

The liner at the ends of each pipe section of the MLP is sealed to avoid water and/or moisture ingress between the outer pipe and the liner. This may be achieved by a 'clad overlay weld' at the end of each first pipe length or 'pipe joint'. According to common practice, clad overlay welds are 50 mm long to enable inspection and, if needed, repair of the pipeline girth welds conjoining the pipe joints.

There are two common methods of laying underwater or submarine pipelines. The so-called 'stove piping method' involves joining pipe stalks together on a pipe-laying vessel by welding each one as the laying progresses. In the so-called 'reeled laying method', the pipeline is assembled onshore and spooled onto a large reel, sometimes also termed a storage reel or drum. Once offshore, the pipeline is spooled off from the reel, aligned, straightened and finally laid on the seabed. In this method, no welding is required during the offshore operation, saving time for the vessel operation.

The reeled laying method is faster and more economical than the stove piping method, such that it is preferred where possible. However, the reeling process obviously generates significant multiple bending strains in the pipeline, which would cause a conventional 2.5-3.0 mm liner in a conventional lined pipe to wrinkle, and it is currently considered that wrinkles are detrimental to an MLP. Thus, all current methods developed to load an MLP onto a reel have been based on the idea that the formation of any wrinkles should be avoided at all costs during the spooling processes.

WO 2008/072970 A1 discloses a method for laying a pipeline having an inner corrosion proof metallic liner that is held inside an outer pipe material by interference stresses. In its method, a section of the pipeline is reeled onto a pipe laying drum, whilst an overpressure is maintained within the section by means of a pressurised fluid. When the pipeline is motionless, the overpressure is relieved, and a further pipeline section is joined to the first section. A new overpressure is then applied within the sections, and the further section is reeled onto the pipe laying drum. This requires the overpressure and pressure-relieving steps every increment when two pipe sections are joined. The pipe laying drum is described in WO 2008/072970 A1 as typically having installed "many" pre-fabricated sections, creating significant repetition of the overpressure and pressure-relieving steps required.

WO2011/048430A describes a method of reel-laying a mechanically lined pipe (MLP) comprising spooling the MLP onto a reel in the complete or substantial absence of internal pressure above ambient pressure in the MLP, where the MLP has a defined liner thickness, to thereby provide an unspooled MLP having wrinkles of less than 4 mm, which can then be removed by pressuring the pipe during pre-commissioning of the MLP.

However, because of inherent variations in diameter, wall thickness and yield strength between MLP joints, there is a possibility that during spooling, the bending moment required to force an MLP pipe length or pipe joint to bend onto the reel may be significantly higher than that required to bend an adjacent MLP pipe joint (i.e. the bending moment capacity of the first joint is significantly higher than that of the adjacent joint). In such an instance, a high compressive strain localises in the joint with a lower bending moment capacity (i.e. the 'weaker joint'), generally near the girth weld joining the two pipe joints. As a result, the weaker joint may suffer from a high local ovality, and the liner may wrinkle at this location, which is clearly undesirable.

The difference in bending moment capacities between successive pipe joints is termed, in the art, "bending moment mismatch" or even just "mismatch". Mismatch is described in more detail in the ASME paper no. OMAE 2011-49389, presented at the OMAE conference in the Netherlands in 2011. This document is incorporated herein by way of reference. The Paper Abstract confirms that natural variation of wall thicknesses and yield strengths determines the potential differences in bending stiffness. These mismatches cause a localised peak in strain and can drive gross deformation of the pipe, which may result in a buckle if not addressed at the engineering stage. The level of mismatch (MM) between two pipes is determined from:

$$MM = 2\frac{M_{p\_s} - M_{p\_w}}{M_{p\_s} + M_{p\_w}}$$

where
$M_{p\_s}$ is the bending moment capacity of a strong pipe joint, and
$M_{p\_w}$ is the bending moment capacity of a weak pipe joint.
$M_{p\_s}$ and $M_{p\_w}$ are determined from $$M_{p\_s/w} = \frac{\sigma_{y\_s/w}}{6}(OD_{s/w}^3 - ID_{s/w}^3)$$

where
$\sigma_{y\_s/w}$ is the yield strength of a strong (or weak) pipe
$OD_{s/w}$ is the outer diameter of a strong (or weak) pipe, and
$ID_{s/w}$ is the inner diameter of a strong (or weak) pipe.

To counteract the effect of mismatch, the thickness of the outer pipe and/or the thickness of the liner could be increased, but both of these options also significantly increase the overall cost of the MLP.

SUMMARY OF THE INVENTION

One object of the present invention is to provide a reelable MLP which accommodates the effect of mismatch, without significant additional cost or pipe redesign.

According to a first aspect of the present invention, there is provided a reelable mechanically lined pipe (MLP) formed from a plurality of pipe joints having conjoining girth welds, and comprising at least a liner and an outer pipe, the outer pipe having a outer diameter $D_H$, and wherein the liner thickness, t, is equal to or less than the value calculated by formula I:

$$t = a_{00}(\epsilon D^{0.75})^0 g^0 + a_{01}(\epsilon D^{0.75})^0 g^1 + a_{10}(\epsilon D^{0.75})^1 g^0 + a_{11}(\epsilon D^{0.75})^1 g^1 + a_{20}(\epsilon D^{0.75})^2 g^0 + a_{21}(\epsilon D^{0.75})^2 g^1 + 0.16 \quad (I)$$

where:
t is in mm,
$a_{ij}$ are constants defined by Table 1:

TABLE 1

| Constants in Liner Thickness Formula | |
|---|---|
| Ij | $a_{ij}$ |
| 00 | 2.39846 |
| 01 | −0.239488 |
| 10 | −5.48161 |
| 11 | 2.35153 |
| 20 | 6.50598 |
| 21 | −1.37840 |

$\epsilon$ is the maximum reeling strain,
g is the radial insertion gap in mm, and
$D = D_H - 2t_H$ is the liner outer diameter in mm, where $D_H$ is defined above and $t_H$ is the wall thickness of the outer pipe of the MLP in mm;
characterised in that the ends of each pipe joint terminate with overlay welds with a length in the range of $L_{min} = 100$ mm and $L_{max} = 4D_H$.

To further confirm, $\epsilon$ is the maximum reeling strain which can be calculated as follows:

$$\varepsilon = \frac{\frac{D_H}{2}}{\frac{D_H}{2} + R}$$

where $D_H$ is the outer diameter of the host pipe and R is the smallest radius the pipe is bent to during the reeling process. Typically the smallest bending radius is equal to the reel hub radius, but sometimes it may be equal to the aligner radius.

Using the index notation, formula I can be written;

$$t = a_{ij}(\epsilon D^{0.75})^i g^j + 0.16$$

where i=0, 1, 2 and j=0, 1

Through this arrangement of the present invention, the strain during reeling of the MLP caused by any bending moment mismatch, is concentrated in the overlay welds and does not effect, or considerably reduces the effect on, the liner.

The above formula I provides the required liner thickness to allow the MLP to be safely reeled and unreeled as defined herein. The effect of bending moment mismatch is counter-balanced by the increase of clad overlay weld length. Therefore, an MLP can then be designed and manufactured to have the liner thickness as per formula I even in the case of high bending moment mismatch, hence being less expensive.

Mechanically lined pipes (MLP) can be formed with any number of layers, liners, coating etc., known in the art, but including at least one 'outer layer' or 'outer pipe' or 'host pipe', such as a carbon steel outer pipe, fixed to at least one 'inner layer' or 'liner', one such liner preferably being formed from a corrosion resistant alloy (CRA), for example a liner such as an alloy 316L, 825, 625, 904L, 22% Cr duplex or 25% Cr super duplex, without metallurgical bonding.

According to the present invention, the MLP is pre-assembled from a number of smaller pipe sections, and each pipe section is formed from a number of pipe lengths or pipe joints. The pipe sections may extend from several meters long up to approximately 1 km long, or be greater than 1 km long. The pipe joints are typically a few meters long, such as 12 m or 24 m, but not limited thereto. Generally the conjoining of the pipe joints comprises a girth or circumferential weld, and a number of conjoined pipe joints form a pipe section. The pipe sections can be conjoined in a similar manner to form the final pipe or pipeline. Typically, a reeled pipeline for subsequent laying via the reeled lay method can be many pipe sections long, and so many kilometers long.

In an alternative definition, there is provided a reelable mechanically lined pipe (MLP) formed from a plurality of pipe joints, a plurality of girth welds conjoining the pipe joints, the MLP comprising a liner and an outer pipe, the outer pipe having a outer diameter hereinafter termed "$D_H$", the liner having a thickness (t) which is equal to or less than the value calculated by formula I as defined above, and overlay welds with a length in the range of $L_{min} = 100$ mm to $L_{max} = 4D_H$ at the ends of each pipe joint.

According to a further aspect of the present invention, there is provided a method of manufacturing a reelable mechanically lined pipe (MLP) as defined herein comprising at least the steps of:
(a) providing a plurality of pipe joints having a liner and outer pipe as defined herein;

(b) terminating the ends of each pipe joint with clad overlay welds whose length is in the range $L_{min}$=100 mm and $L_{max}$=4$D_H$;
(c) girth welding the pipe joints together to provide pipe sections; and.
(d) girth welding the pipe sections together to provide the MLP.

According to another aspect of the present invention, there is provided a method of reeling onto a reel a reelable mechanically lined pipe (MLP) as defined herein comprising at least the steps of:
(a) providing a reelable mechanically lined pipe (MLP) as defined herein; and
(b) reeling the MLP onto the reel in the complete or substantial absence of internal pressure above ambient pressure in the MLP.

The present invention encompasses all combinations of various embodiments or aspects of the invention described herein. It is understood that any and all embodiments of the present invention may be taken in conjunction with any other embodiment to describe additional embodiments of the present invention. Furthermore, any elements of an embodiment may be combined with any and all other elements from any of the embodiments to describe additional embodiments.

BRIEF DESCRIPTION OF THE DRAWINGS

An embodiment of the present invention will now be described by way of example only, and with reference to the accompanying drawings in which.

DESCRIPTION OF PREFERRED EMBODIMENTS

Figure 1:
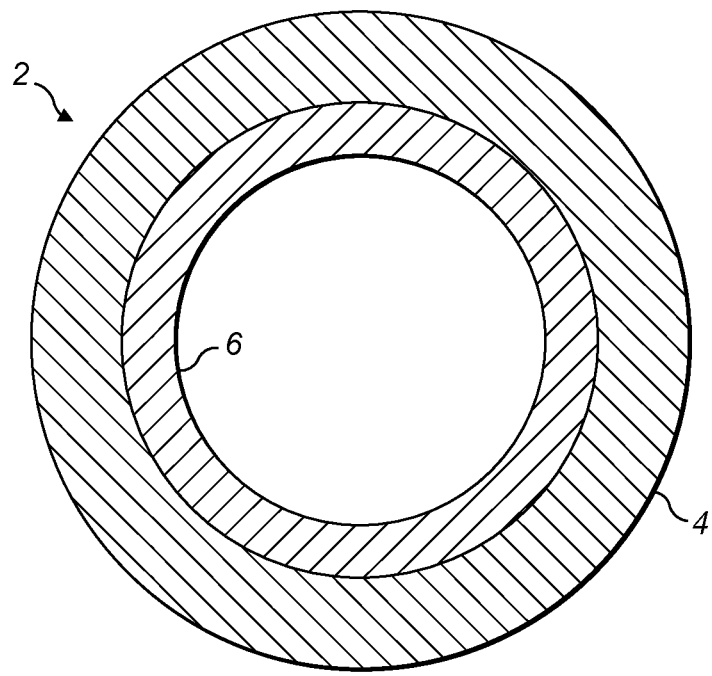
FIG. 1 is a schematic cross-sectional view of an MLP.

Referring to the drawings, FIG. 1 shows a schematic cross-sectional view of parts of a mechanically lined pipe (MLP) 2. The MLP 2 generally comprises a number of layers (including coating), only two of which are shown in FIG. 1 for clarity, comprising an outer layer 4 which can be a carbon steel pipe, and an inner layer or liner 6 being formed from a corrosion resistant alloy (CRA), such as alloy 316L. The relative dimensions shown in FIG. 1 are not to scale, and are provided for clarity of representation.

In the conventional manufacture of an MLP, an inner layer is usually provided into an outer layer and then expanded to provide an interference contact stress between the two layers. However, bending of a pipe formed from two such layers, such as spooling on or off the reel, and especially any buckling of the pipe, is assumed to create wrinkles which may not be removable after spooling off, and which are therefore considered to be sufficiently detrimental to the laid pipeline that buckling and the forming of any wrinkles should be avoided at all costs.

Thus, for such laying methods, a high interference contact stress is desired between the inner and outer layers to prevent wrinkling of the inner liner. The interference contact stress can be lost during the coating procedure and will certainly be lost during plastic deformation which occurs during bending. However, if interference stress is lost during the $1^{st}$ or $2^{nd}$ strain event then wrinkles will usually appear in the $3^{rd}$ or $4^{th}$ strain event. It can also be difficult to control the degree of intended interference contract stress during manufacturing of such pipes, and a high degree of variation of interference stress occurs in practice.

Buckling during reeling should also be avoided, preferably without having to increase the thickness of either the outer layer 4 or the inner layer or liner 6.

Figure 2:
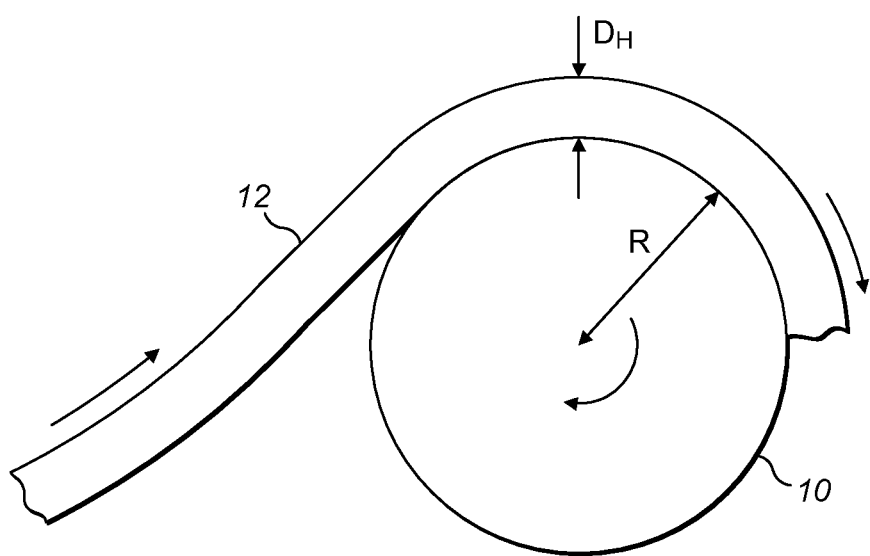
FIG. 2 is a diagrammatic view of a method of spooling an MLP onto a reel.

FIG. 2 shows a diagrammatic reel 10 having a smallest bending radius "R", and a mechanically lined pipe (MLP) 12 having an outer pipe diameter "$D_H$". The MLP 12 is formed in long lengths of pipe sections (or pipe "stalks") joined together to form a single pipeline. Stalks are normally 1 km long, but can be longer or smaller as required. FIG. 2 shows spooling of the MLP 12 onto the reel 10.

By way of example only, the reel 10 could have a bending radius R of 8.23 m, and the MLP 12 could have a diameter $D_H$ of 12.75 inches (323.9 mm) and a total wall thickness of 18.9 mm.

Figure 3:
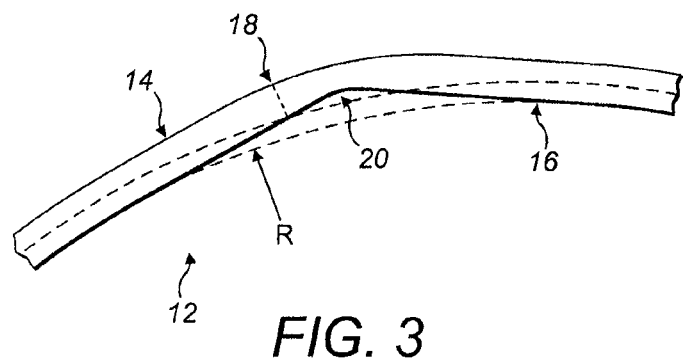
FIG. 3 is an illustration of the effect of a high mismatch during reeling in a prior art MLP.

FIG. 3 shows a portion of the MLP 12 comprising the ends of first and second pipe joints 14, 16 conjoined by a girth weld 18. Whilst it is preferred and intended that each pipe joint is exactly the same, variations therein, as discussed above, can lead to some pipe joints being 'stronger' than other pipe joints. For example, the first pipe joint 14 is a stronger pipe joint 14 than the second or 'weaker' pipe joint 16. As the portion of the MLP 12 shown in FIG. 3 is bent onto the reel 10 of radius R of FIG. 2, ovality and strain localise in the weaker joint 16 near the girth weld 18 because the bending moment capacity of the weaker joint 16 is significantly lower than that of the stronger joint 14. This eventually leads to buckling 20 within the weaker pipe joint 16, and wrinkling of the liner 6 therewithin.

Figure 4:
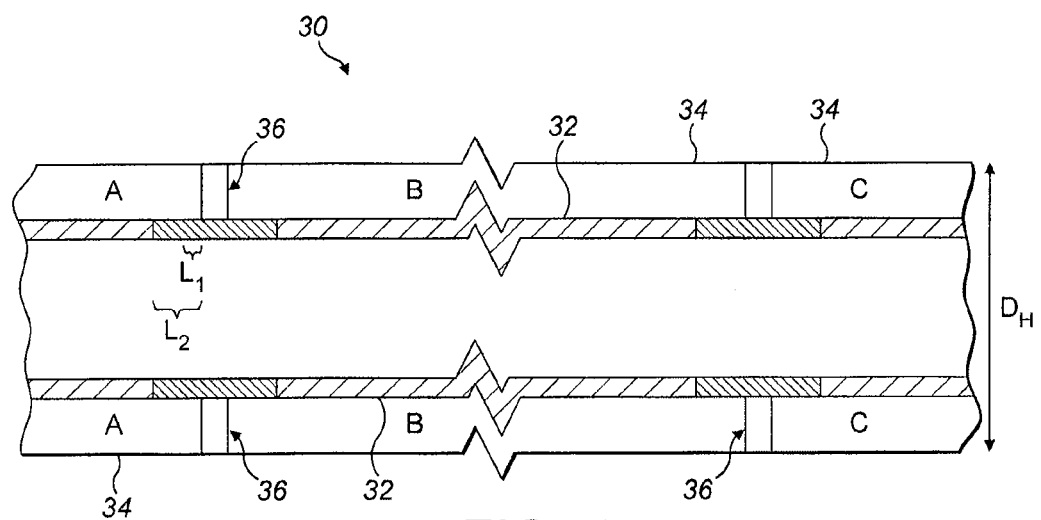
FIG. 4 is a cross-sectional longitudinal view through a portion of a reelable MLP according to one embodiment of the present invention.

FIG. 4 shows a reelable MLP 30 according to one embodiment of the present invention. The reelable MLP comprises a liner 32 and an outer pipe 34. The outer pipe 34 has an outer diameter $D_H$. The reelable MLP 30 is formed of a plurality of pipe sections. FIG. 4 shows three full or partial pipe joints labelled A, B and C, of a given pipe section. The pipe joints are conjoined using girth welds 36 known in the art.

Conventionally, the pipe on either side of the girth weld 36 has internally welded clad overlay welds added thereto, typically 50 mm long, followed by the liner 32. This length of clad overlay weld is currently sufficient to enable inspection and any girth weld repair, if needed, and is sufficient to stop water ingress between the liners 32 and the outer pipes 34. Hitherto, the clad overlay welds have served no other significant purpose, such that they have conventionally been considered as only requiring sufficient length for these purposes. In FIG. 4, such a conventional clad overlay weld length is labelled $L_1$.

However, the present invention has determined that the clad overlay welds could accommodate the localised strain that is caused by any mismatch between adjacent pipe joints. Conventional solutions to accommodate high levels of mismatches during reeling without significant liner wrinkling only have been to increase the thickness of the carbon steel pipe and/or the thickness of the liner, either of which cause increased expense. The present invention has found that increasing the length of the clad overlay welds allows accommodating high strains due to mismatches without the need to increase the thickness of the outer pipe or the liner.

Thus, as shown in FIG. 4, the present invention involves increasing the length of the overlay welds from $L_1$ (as a 'standard' weld length, e.g. 50 mm) to $L_2$. $L_2$ is between $L_{2min}=100$ mm and $L_{2max}=4D_H$ where $D_H$ is the outer diameter of host pipe. Clearly, in FIG. 4, $L_2>L_1$.

$L_2$ depends on the sizes and grades of the host pipe and liner and the magnitude of mismatch, and will generally be calculated on a pipe-by-pipe basis.

Various modifications and variations to the described embodiment of the invention will be apparent to those skilled in the art without departing from the scope of the invention as defined in the appended claims. Although the invention has been described in connection with a specific preferred embodiment, it should be understood that the invention as claimed should not be unduly limited to such specific embodiment.

The invention claimed is:

1. A reelable mechanically lined pipe (MLP) formed from a plurality of pipe joints having conjoining girth welds, and comprising at least a liner and an outer pipe, the outer pipe having an outer diameter, $D_H$, and wherein the liner thickness, t, is less than or equal to a value calculated by formula I:

$t=a_{00}(\epsilon D^{0.75})^0 g^0+a_{01}(\epsilon D^{0.75})^0 g^1+a_{10}(\epsilon D^{0.75})^1 g^0+a_{11}(\epsilon D^{0.75})^1 g^1+a_{20}(\epsilon D^{0.75})^2 g^0+a_{21}(\epsilon D^{0.75})^2 g^1+0.16$ where:

t is in mm: $a_{00}$, $a_{01}$, are constants defined by Table 1:

| Ij | $a_{ij}$ |
|---|---|
| 00 | 2.39846 |
| 01 | −0.239488 |
| 10 | −5.48161 |
| 11 | 2.35153 |
| 20 | 6.50598 |
| 21 | −1.37840 |

$\epsilon$ is the maximum reeling strain, g is the radial insertion gap in mm, and $D=D_H-2t_H$ is the liner outer diameter in mm, wherein $D_H$ is defined above and $t_H$ is the wall thickness of the outer pipe of the MLP in mm;

wherein the ends of each pipe joint terminate with overlay welds of a length in the range of $L_{min}=100$ mm and $L_{max}=4D_H$, and wherein the MLP is able to be reeled onto a reel having a radius R and $$\varepsilon = \frac{\frac{D_H}{2}}{\frac{D_H}{2}+R}.$$

2. A reelable MLP as claimed in claim 1, wherein the outer pipe comprises a carbon steel outer pipe.

3. A reelable MLP as claimed in claim 1, wherein the liner comprises a Corrosion Resistant Alloy (CRA) liner.

4. A reelable MLP as claimed in claim 3, wherein the liner is alloy 316L, 825, 625, 904L, 22% Cr duplex or 25% Cr super duplex.

5. A reelable MLP as claimed in claim 1, spooled on a reel in the complete or substantial absence of internal pressure above ambient pressure in the MLP during spooling.

6. A reelable MLP as claimed in claim 1, wherein at least two pipe joints of the MLP have one of different outer pipe thicknesses, different outer diameters, and different outer pipe thicknesses or outer diameters.

7. A method of manufacturing a reelable mechanically lined pipe (MLP) as defined in claim 1, comprising at least the steps of:
    (a) providing a plurality of pipe joints having a liner and an outer pipe as defined in claim 1;
    (b) terminating the ends of each pipe joint with clad overlay welds whose length is in the range $L_{min}=100$ mm and $L_{max}=4D_H$;
    (c) girth welding the pipe joints together to provide pipe sections; and
    (d) girth welding the pipe sections together to provide the MLP.

8. A method of reeling onto a reel a reelable mechanically lined pipe (MLP) as defined in claim 1 comprising at least the steps of:
    (a) providing a reelable mechanically lined pipe (MLP) as defined in claim 1; and
    (b) reeling the MLP onto the reel in the complete or substantial absence of internal pressure above ambient pressure in the MLP.

* * * * *

UNITED STATES PATENT AND TRADEMARK OFFICE
CERTIFICATE OF CORRECTION

PATENT NO. : 9,885,431 B2  
APPLICATION NO. : 14/646283  
DATED : February 6, 2018  
INVENTOR(S) : Aurélien Pepin and Tomasz Tkaczyk Page 1 of 1

It is certified that error appears in the above-identified patent and that said Letters Patent is hereby corrected as shown below:

In the Claims

Claim 1 at Column 7, Line 36, "$\epsilon$" should read -- $\varepsilon$ --.

Signed and Sealed this  
Tenth Day of April, 2018

Andrei Iancu  
*Director of the United States Patent and Trademark Office*